United States Patent

[11] 3,542,094

| [72] | Inventors | Duane M. Gibson |
| | | Milwaukie; |
| | | Myron D. Tupper, Portland, Oregon |
| [21] | Appl. No. | 713,911 |
| [22] | Filed | March 18, 1968 |
| [45] | Patented | Nov. 24, 1970 |
| [73] | Assignee | Omark Industries Inc. |
| | | Portland, Oregon |
| | | a corporation of Oregon |

[54] SAW BAR BREAKAWAY MECHANISM
13 Claims, 9 Drawing Figs.

[52] U.S. Cl. ............................................. 143/32,
144/34
[51] Int. Cl. ....................................... B27b 17/02,
A01g 23/02
[50] Field of Search ........................................... 143/32;
144/34, 3—4; 30/(Digest)

[56] References Cited
UNITED STATES PATENTS

| 2,165,524 | 7/1939 | Wolf | 143/32 |
| 2,670,017 | 2/1954 | Fiest | 143/32 |

*Primary Examiner*—Donald R. Schran
*Attorney*—Buckhorn, Blore, Klarquist and Sparkman ABSTRACT: A saw bar breakaway mechanism 10 mounts a saw bar 12 on the lower end of a head 14 at the end of a boom 16 of a timber harvester 17. The breakaway mechanism includes a bar mounting plate 18 normally clamping the saw bar and is mounted rigidly on a mounting block 22. When the saw bar is pushed downwardly with a force approaching but below the breaking strength of the saw bar, a pin 26 is pried out of a slot 28 to free the bar from the head 14.

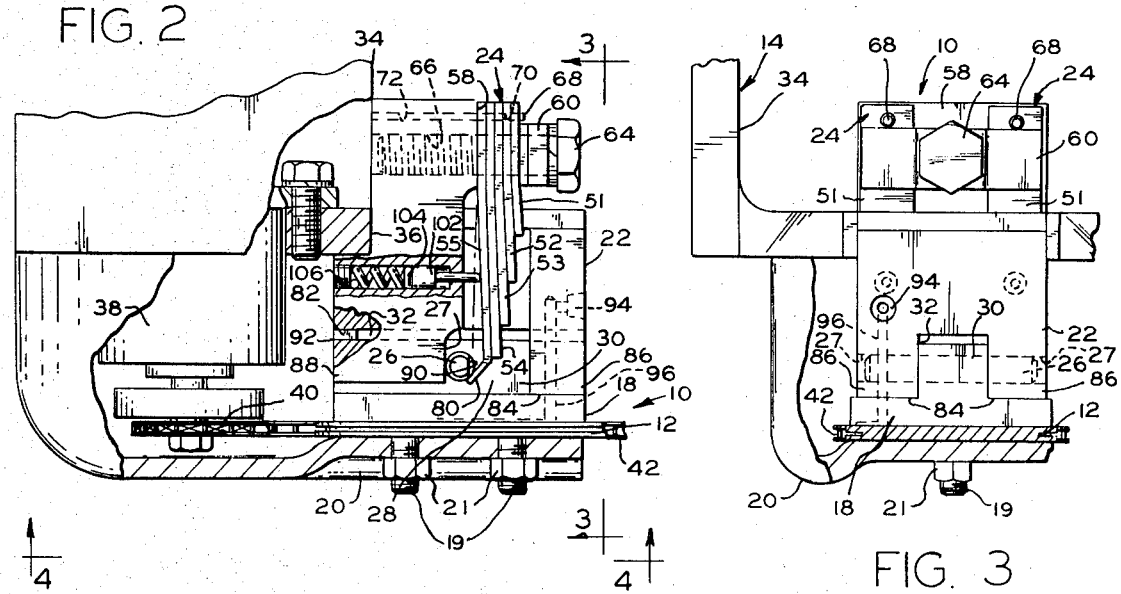

3,542,094

SAW BAR BREAKAWAY MECHANISM

This invention relates to a saw bar breakaway mechanism, and more particularly to a mount for a saw bar adapted to rigidly hold the saw bar until the saw bar is subjected to a near-breaking force.

In a timber harvester including a chain saw mounted on the lower end of a harvesting head mounted on a boom, the saw bar of the chain saw is rigidly connected to the frame of the head. If the saw bar is subjected to excessive lateral loads as may occur, for example, if a tree being harvested slips relative to gripping mechanisms of the head while the saw bar is under the tree, the saw bar and/or the structure carrying it is broken and the saw chain also may be damaged. It would be desirable to normally mount the saw bar rigidly and release the saw bar when a force occurs which approaches a breaking magnitude.

An object of the invention is to provide a saw bar breakaway mechanism.

Another object of the invention is to provide a mount for a saw bar adapted to rigidly hold the saw bar until the saw bar is subjected to a near-breaking force.

A further object of the invention is to provide a chain saw structure in which a mechanism supports a saw bar rigidly when the force on the saw bar does not approach the breaking point of the saw bar and releases the saw bar when the force thereon approaches the breaking point of the saw bar.

Another object of the invention is to provide a saw bar mount having a snap release operable when force on the saw bar reaches the maximum safe limit of the saw bar.

A further object of the invention is to provide a timber harvester with a saw bar mounting block having a stiff spring normally locking a saw bar mounting plate rigidly on the block and releasing the mounting plate when force on the saw bar reaches the maximum safe limit.

Another object of the invention is to provide a chain saw structure in which a saw bar mount is held by a snap release which is not effected by tension on a saw chain on a saw bar held by the mount.

Another object of the invention is to provide a saw bar mount held by spring means movable between an open receiving position and a closed locking position and resilient biasing means urging the spring means toward its open receiving position to facilitate receiving a saw bar mounting member.

The invention provides a saw bar breakaway mechanism for a chain saw including mounting means supporting a saw bar and connected rigidly to frame means of the chain saw by breakaway means which releases the mounting means from the frame means when a maximum safe load on the saw bar is approached. In a breakaway mechanism forming one specific embodiment of the invention, a saw bar is clamped rigidly between a bar mounting plate and a sprocket guard cover and the bar mounting plate has a keying rib projecting into a slot in a mounting block and strong leaf spring assemblies on the block engage a pin on the bar mounting plate to normally lock the bar mounting plate on the block. The leaf spring assemblies are normally held in closed, locking positions, and are manually releasable to permit spring plungers to move them to open positions to facilitate placing the pin on the bar in a position to be locked by the leaf spring assemblies.

In the drawings:

FIG. 1 is a side elevation view of a timber harvester having a saw bar breakway mechanism forming one embodiment of the invention;

FIG. 2 is a fragmentary view similar to FIG. 1 but on a larger scale;

FIG. 3 is an enlarged, fragmentary elevation view taken along line 3–3 of FIG. 2;

FIG. 4 is an enlarged, fragmentary bottom plan view taken along line 4–4 of FIG. 2;

Figure 5:
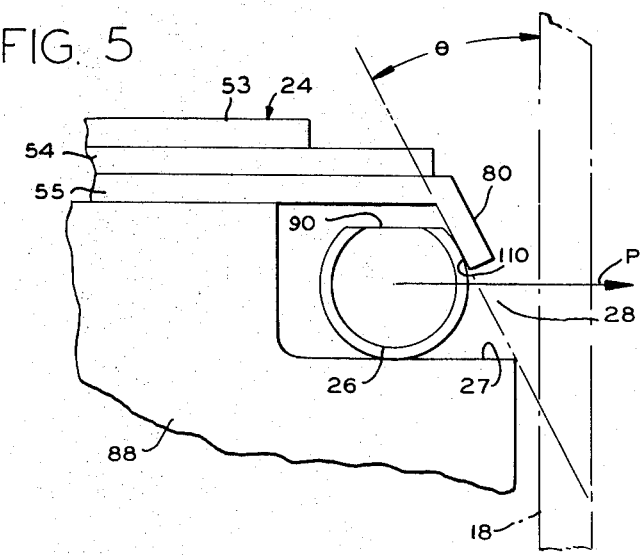
FIGS. 5, 6, 7 and 8 are schematic views of the saw bar breakaway mechanism of FIG. 1 and vectors representing forces involved.
Figure 6:
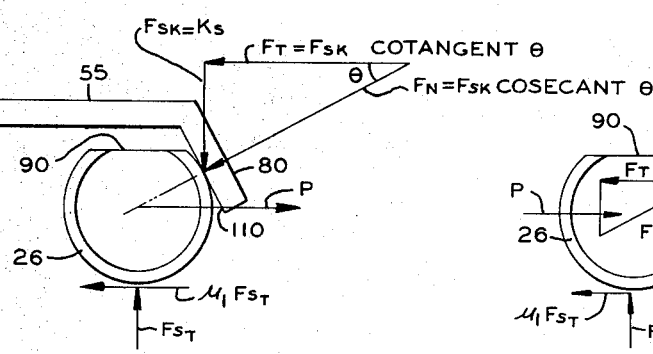
Figure 7:
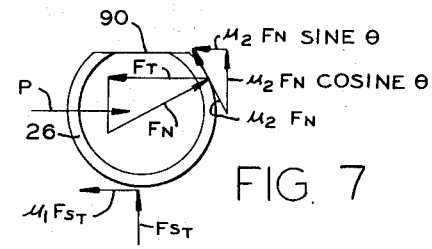

Referring now in detail to the drawings, a saw bar mechanism 10 forming one embodiment of the invention mounts a saw bar 12 on the lower end of a head 14 carried by a boom 16 of a timber harvester 17. A bar mounting plate 18 and a sprocket guard 20 clamp the saw bar therebetween, studs 19 on the bar mounting plate 18 and extending through a slot 23 in the saw bar and nuts 21 serving to press the guard and the saw bar toward the mounting plate.

The mounting plate 18 normally is held rigidly on the bottom of a mounting block 22 by stiff leaf spring assemblies 24 holding end portions of a cylindrical pin 26 against one side 27 of a slot 29 in the block. A keying bar 30 on the plate 18 fits in a slot 32 in the mounting block 22. The mounting block is mounted rigidly by welding or the like on a bracket 34 of the head 14, which has a motor mounting plate 36 mounting a hydraulic motor 38 driving a spur type drive sprocket 40 driving a saw chain 42, which courses along the grooved saw bar, which is held on the mounting plate 18 in a position spaced from the drive sprocket and tensioning the chain so that the chain courses on the sprocket.

The two spring assemblies 24 (FIG. 2) each include leaf springs 51, 52, 53, 54 and 55 and are held against a raised face 58 of the mounting block 22 by a clamping plate 60 and a capscrew 64 screwed into a tapped bore 66 in the block. Rollpins 68 extend loosely through holes 70 in the springs 51 to 55 and into holes 72 in the mounting block. The rollpins serve as hangers to position the springs 51 to 55 during assembly and permit pivoting of the springs between open and closed positions.

The springs 55 have inclined or hooked, flat end portions 80 (FIG. 2) pushing the pin 26 upwardly and toward the left, as viewed in FIG. 2, to seat one end portion of the bar against shim 82 in the slot 32 and the mounting plate 18 against planar end faces 84 of post portions 86 of the block to provide a three point contact between the mounting plate and the block. The post portions 86 extend below portions 88 of the mounting block 22. The end portions 80 extend at substantial angles to the shanks of the leaf springs 55, and engage the pin 26 near flats 90 on the pin. An L-shaped passage 94 and passage 96 leading to a lubrication passage in the saw bar are provided in the block 22, one of the post portions 86 and the plate 18 for supplying a lubricant to the saw bar.

The spring assemblies 24 normally hold the mounting plate 18 rigidly on the block 22 and permit the pin 26 to snap downwardly out of the slot 28 when the maximum safe force, approaching but below the breaking strength of the saw bar, is applied to the saw bar 12. Thus, breakage of the saw bar is prevented. When excessive downward force is applied to the saw bar, the keying bar 30 pivots on a corner 92 of the shim 82 and the pin 26 snaps out from the portions 80 of the springs 55. This loosens the saw chain which then disengages itself from the sprocket 40. The capscrew 64 then may be loosened after disengaging the head 14 from the tree, and the saw bar and chain is again placed in operative position and the capscrew retightened. Similarly, when the maximum safe upward force is applied to the saw bar 12, the mounting plate 18 is pivoted on the post portions 86 and the pin 26 is snapped out of the slot 18 to prevent breakage.

To facilitate reinsertion of the pin under the portions 80 of the springs 55, there are provided plungers 102 slidable in bores 104 in the block 22 extending transversely of the spring assemblies 24. Light compression springs 106 urge the plungers 102 to right, as viewed in FIG. 2, with light forces. When the capscrew 64 is loosened, the plungers 102 swing the leaf spring assemblies counterclockwise, as viewed in FIG. 2, sufficiently to permit the end portions of the pin 26 to clear the end portions 80 of the springs 55 as the end portions of the pin 26 are inserted into the slot 28. The springs 106 are so weak as to be of negligible forces on the spring assemblies 24 when the spring assemblies are clamped in their locking positions by the clamping plate 60 but are strong enough to hold the spring assemblies against the clamping plate 60 and in open positions relative to the wall of the slot 28 when the capscrew 64 has been loosened.

FIGS. 5 to 9 illustrate the forces of the spring assemblies 24 locking the saw bar 12 and mounting plate 18 to the mounting block 22, where P is the breakaway force and is set at a value of from 80 percent to 90 percent of the breaking strength of the saw bar, $\theta$ is the angle between planar contacting face 110 and the mounting plate 18 when the springs 55 are in their locking positions, K is the spring constant of the spring assemblies 24, $\mu_1$ is the coefficient of friction between the side 27 of the slot 28 in the mounting block and the pin 26, $\mu_2$ is the coefficient of friction between the faces 110 and the pin 26, S is the total deflection of the spring assemblies, $F_n$ is the radial force on the pin 26, $F_{sk}$ is the vertical component of $F_n$, $F_t$ is the horizontal component of $F_n$, $F_{st}$ is the normal, vertical force on the pin.

For horizontal equilibrium of the pin 26, $F_x$, sum of the horizontal forces, is equal to O, and $$P = u_1 F_{st} + F_t + u_2 F_n \sin \theta$$
$$F_4 = F_{sk} \cot \theta$$
$$F_{sk} = KS$$
$$F_n = F_{sk} \operatorname{cosec.} \theta$$
$$P = u_1 F_{st} + F_{sk} \cot \theta + u_2 F_{sk} \operatorname{cosec.} \theta \sin \theta$$
$$\phantom{P}= u_1 F_{st} + F_{sc} \cot \theta + u_2 F_{sk}$$
$$P = u_1 F_{st} + F_{sk} (\cot \theta + u_2)$$

Figure 8:
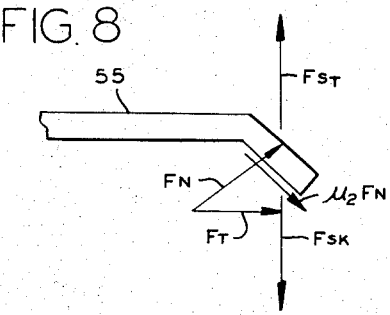
Figure 9:
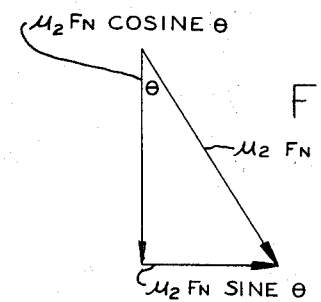
FIG. 9 is a vector diagram illustrating forces involved in the breakaway mechanism of FIG. 1.

Figs. 8 and 9 illustrate the condition of spring equilibrium.

For vertical equilibrium:

$$F_{st} = F_{sk} + u_2 F_n \cos \theta$$
$$\phantom{F_{st}} = F_{sk} + u_2 F_{sk} \operatorname{cosec.} \theta \cos \theta$$
$$F_{st} = F_{sk} (1 + u_2 \cot \theta)$$

Therefore, $$P = u_1 [F_{sk}(1 + u_2 \cot \theta)] + F_{sk}(\cot \theta + u_2)$$
$$\phantom{P} = u_1 F_{sk} + u_1 u_2 F_{sk} \cot \theta + F_{sk} \cot \theta + F_{sk} u_2$$
$$\phantom{P} = F_{sk}[u_1 + u_1 u_2 \cot \theta + \cot \theta + u_2]$$

where $F_{sk} = KS$

As an example of the above, where $\theta = 30°$, $u_1 = u_2 = 0.15$ and $P = 100$ lbs., cot o = 1.73

$$100 = F_{sk}[0.15 + (0.15)^2(1.73) + 1.73 + \theta_2 15]$$
$$F_{sk} = \frac{100}{2.07}$$
$$F_{sk} = 48 \text{ lbs.}$$

That is 48 pounds is the required spring force of the spring assemblies 24 when in the locking positions thereof.

It should be noted that tension on the saw chain 42 does not affect the breakaway force. This is because all forces on the pin 26 from tension of the saw chain merely press the pin against the sidewall 27 of the slot 28 and the sidewall 27 is normal to the plane of the saw bar. That is, any force on the pin 26 from tension of the saw bar is perpendicular to the sidewall 27.

The saw bar breakaway mechanism 10 protects the saw bar and the saw chain from damage when the saw bar is subjected to excessive loads, and is especially useful for saw bars of timber harvesters. If the maximum safe force on the bar is approached, the bar is released, permits slack in the chain and the chain drops off the sprocket. The bar mounting plate 18 has a three point contact with the mounting block 22 to provide good stability. The bar is held rigidly to maintain saw chain tension, and the breakaway mechanism releases from either an up load on the saw bar or a down load thereon.

We claim:

1. In a chain saw:
   frame means;
   a sprocket supported by the frame means;
   a saw chain driven by the sprocket;
   a saw bar of a predetermined lateral strength guiding the saw chain;
   mounting means including a first interlocking means secured to the frame means and a second interlocking means secured to the saw bar;
   the first interlocking means serving to engage the second interlocking means to secure the saw bar rigidly to the frame means; and the first interlocking means serving to release the second interlocking means when an excessive load approaching said predetermined lateral strength is applied to the saw bar.

2. The chain saw of claim 1 wherein the first interlocking means comprises a strong spring detent mechanism.

3. The chain saw of claim 1 wherein one of the interlocking means comprises slotted socket means and the other interlocking means includes a bar member fitting in the socket means.

4. The chain saw of claim 3 wherein the first interlocking means also includes a cross slot and the second interlocking means also includes a pin projecting from the sides of the bar member and fitting in the cross slot.

5. The chain saw of claim 4 including a pair of stiff leaf spring assemblies secured to the frame means and hooked over the pin.

6. The chain saw of claim 5 wherein the first interlocking means comprises a block having a pair of posts and the second interlocking means comprises a saw bar mounting plate secured to the bar member and engaging the posts, the block including means engaging an end portion of the bar member so that there is a three point engagement between the coupling means.

7. The chain saw of claim 5 wherein the spring assemblies press the pin against one side of the cross slot.

8. The chain saw of claim 1 including a prime mover carried by the frame means for driving the sprocket the mounting means including a mounting block fixed rigidly to the frame means, a saw bar mounting plate carrying the saw bar, and overload coupling means of less than said predetermined lateral strength locking the plate to the block.

9. The chain saw of claim 8 wherein the overload coupling means comprises crossed slots in the block, crossed projecting members on the plate entering the slots and retaining means holding the projecting members in the slots.

10. The chain saw of claim 9 wherein the crossed projecting members comprise a keying bar adapted to fit in one of the slots and a pin fitting into the other slot.

11. The chain saw of claim 10 wherein the retaining means comprises a pair of stiff leaf spring means having hooked ends overhanging the end portions of the pin.

12. The chain saw of claim 10 wherein the leaf spring means press the pin against the sidewalls of the slot in which the pin fits.

13. The chain saw of claim 12 including a shim engaging one end portion of the keying bar and including a pair of post means bracketing the keying bar and engaging the plate adjacent the other end portion of the bar, whereby a three point engagement of the plate and the keying bar with the mounting block is provided.

UNITED STATES PATENT OFFICE
CERTIFICATE OF CORRECTION

Patent No. 3,542,094      Dated November 24, 1970

Inventor(s) Duane M. Gibson and Myron D. Tupper

It is certified that error appears in the above-identified patent and that said Letters Patent are hereby corrected as shown below:

Column 1, line 63, specification page 3, line 14, "breakway" should be -- breakaway --;

Column 2, line 64, specification page 6, line 2, insert "the" after -- to --; and Column 3, line 21, specification page 7, line 4, "$F_4$" should be -- $F_t$ --.

SIGNED AND SEALED

FEB 23 1971

(SEAL)
Attest:

Edward M. Fletcher, Jr.
Attesting Officer

WILLIAM E. SCHUYLER, JR
Commissioner of Patents